US005436670A

United States Patent [19]

Tachibana

[11] Patent Number: 5,436,670

[45] Date of Patent: Jul. 25, 1995

[54] IMAGE DISPLAY APPARATUS WHEREIN THE NUMBER OF CHARACTERS DISPLAYED IS THE SAME REGARDLESS OF THE FREQUENCY OF THE INPUT SIGNAL

[75] Inventor: Miyuki Tachibana, Nagasaki, Japan

[73] Assignee: Mitsubishi Denki Kabushiki Kaisha, Tokyo, Japan

[21] Appl. No.: 227,286

[22] Filed: Apr. 13, 1994

[30] Foreign Application Priority Data

Apr. 16, 1993 [JP] Japan .................................. 5-089826

[51] Int. Cl.[6] .............................................. H04N 5/445

[52] U.S. Cl. ...................................... 348/581; 345/26; 345/13; 345/128; 348/563

[58] Field of Search ............... 348/524, 563, 561, 581, 348/468, 718; 345/129, 130, 143, 195, 213, 26, 12, 13, 25, 128, 141, 132, 115, 116; H04N 9/74, 5/455

[56] References Cited

U.S. PATENT DOCUMENTS

| | | | |
|---|---|---|---|
| 3,911,420 | 10/1975 | Lampsen | 345/130 |
| 4,574,279 | 3/1986 | Roberts | 345/25 |
| 4,683,469 | 7/1987 | Elsmore et al. | 345/26 |
| 4,701,753 | 10/1987 | Borg | 345/130 |
| 4,748,504 | 5/1988 | Ikeda et al. | 340/721 |
| 5,014,129 | 5/1991 | Imanishi | 348/581 |
| 5,202,669 | 4/1993 | Ishimochi et al. | 340/721 |
| 5,291,185 | 3/1994 | Yoshimura | 345/213 |

FOREIGN PATENT DOCUMENTS

| | | | |
|---|---|---|---|
| 0180450 | 5/1986 | European Pat. Off. | H04N 5/455 |
| 55-67845 | 5/1980 | Japan | G09G 1/00 |
| 62-262088 | 11/1987 | Japan | G09G 1/06 |
| 2-202784 | 8/1990 | Japan | H04N 5/278 |
| 2093319 | 8/1982 | United Kingdom | G09G 1/16 |

*Primary Examiner*—James J. Groody
*Assistant Examiner*—Jeffrey S. Murrell
*Attorney, Agent, or Firm*—Burns, Doane, Swecker & Mathis

[57] ABSTRACT

An image display apparatus for displaying an image and characters superposed on the image comprising a synchronizing signal dividing unit for dividing the frequency of an input synchronizing signal to generate a divided synchronizing signal, a character generating unit for generating, in response to the divided synchronizing signal, characters to be superposed on the image, and a character speed converting unit for converting the speed of the characters generated by the character generating unit, thereby the number of characters outputted from the character speed converting means in one synchronization period is made to be substantially constant regardless of the frequency of the input synchronizing signal.

14 Claims, 13 Drawing Sheets

4a (a) INPUT SIGNAL (b) HS (c) VIDEO SIGNAL (d) DRIVIDING VOLTAGE (e) H (f) CHARACTER DATA (g) DISPLAY SCREEN

IMAGE DISPLAY APPARATUS WHEREIN THE NUMBER OF CHARACTERS DISPLAYED IS THE SAME REGARDLESS OF THE FREQUENCY OF THE INPUT SIGNAL

BACKGROUND OF THE INVENTION

1. Field of the invention

The present invention relates to an image display apparatus such as an automatic scanning type display monitor capable to be synchronized with various synchronizing signals having various frequencies, and more particularly to a character generating circuit in such an image display apparatus for generating characters to be superimposed on the image displayed on the image display apparatus.

2. Description or the Related Art

FIG. 1 is a diagram showing in detail a display character generating unit 4 in a conventional image display apparatus. In the figure, reference numeral 41 represents a display character generating IC, 42 is a clock signal generating unit for generating a display character generating clock signal C′ which is fed into the display character generating IC 41, and H and V are a horizontal synchronizing signal and a vertical synchronizing signal. The display character generating clock signal is hereinafter referred to as a basic clock signal.

A description will now be given of the operation. In order to carry out character display in synchronization with an input signal inputted into the image display device, the display character generating IC 41 is fed with the horizontal synchronizing signal H and the vertical synchronizing signal V which are included in the input signal. The display character generating IC 41 is controlled in response to a control signal CC.

On the other hand, the clock signal generating unit 42 generates the basic clock signal C′ necessary for generating characters to be displayed. The basic clock signal C′ fed from the clock signal generating unit 42 is identical with a dot clock signal for a pixel forming a display character.

Here, the display character generating IC 41 will be described in brief. The display character generating IC 41 is provided with a built-in character generator ROM in which character data such as alphanumeric characters are previously stored. Therefore, it is possible to display a desired character by designating an address in the character generator ROM in which the character is stored.

On the other hand, as shown in FIG. 2A, in the character data stored in the character generator ROM, each character is formed by 12×18 dots (width×height), each dot consisting of $d_V$ in vertical width and $d_H$ in horizontal width. For example, "01" shown in the drawing means an address in which a character data "1" is stored. That is, it is possible to display the character data "1" by addressing the storage address "01." The character to be displayed is designated by the control signal CC in FIG. 1. The control signal CC is supplied from a control unit (corresponding to a control unit shown in FIG. 5 as described later) which controls the entire image display apparatus.

A character data designated to be displayed by the control signal CC is read from the ROM for generating characters, dot by dot, in synchronization with the basic clock signal C′ outputted from the clock signal generating unit 42. Further, the character data is outputted from the display character generating IC 41 as display character data. FIG. 2B shows this state. In the drawing, $f_C$, is the frequency of the dot clock signal C′, $t_C$ is a period which is expressed as $t_C=1/f_C$ and corresponds to the length $d_H$ of one dot.

Here, the dot clock signal is in synchronization with the horizontal synchronizing signal H shown in FIG. 1 inputted into the display character generating IC 41.

It is assumed that the frequency $f_C$ of the dot clock signal C′ is a constant frequency $f_C$. When, for example, the frequency of the horizontal synchronizing signal H inputted into the display character generating IC 41 is $f_H$, the maximum number $n_H$ of characters which can be horizontally displayed in one horizontal period is given as follows:

$$n_H = \frac{\frac{1}{f_H}}{\frac{1}{f_C} \times 12 \text{ bits}} = \frac{f_C}{12 \times f_H} \quad (1)$$

(where a horizontal blanking period is not taken into account as a matter of convenience.)

FIG. 3A, FIG. 3B, and FIG. 3C show a timing relationship between the display character and a horizontal periodic signal. As shown in FIG. 3A, characters "CONTRAST MAX" or "BRIGHT 00", for example, are displayed in one horizontal synchronization period. When the frequency of the basic clock signal is increased, the period for displaying one character is shortened, as shown in FIG. 3B and FIG. 3C.

A description will now be given of a case in which the frequency $f_H$ of the horizontal synchronizing signal H inputted into the display character generating IC 41 increases.

In this case, it is assumed that the frequency of the horizontal synchronizing signal H is $f_{H'}$. Then, since the frequency $f_C$ of the dot clock signal C′ is the constant frequency $f_C$, the maximum number $n_H$ of characters which can be horizontally displayed in one horizontal period can be expressed as follows:

$$n_{H'} = \frac{\frac{1}{f_{H'}}}{\frac{1}{f_C} \times 12} = \frac{f_C}{12 \times f_{H'}} \quad (2)$$

By comparing the equations (1) and (2), since $f_H<f_{H'}$ as assumed above, the relation $n_H>n_{H'}$ can be obtained. That is, when the frequency $f_H$ of the horizontal synchronizing signal H increases, the number of characters which can be horizontally displayed is decreased.

For example, if $f_{H'}=2f_H$, the following expressions can be derived from equations (1) and (2):

$$n_{H'} = \frac{f_C}{12 \times f_{H'}} = \frac{f_C}{12 \times 2f_H} \quad (3)$$

$$n_{H'} = \frac{1}{2} \times n_H \quad (4)$$

That is, when the frequency $f_C$ of the dot clock signal C′ is the constant frequency $f_C$, and when the frequency of the horizontal synchronizing signal H is doubled, the number of characters which can be displayed in one horizontal synchronization period is reduced by one half (see FIG. 4A and FIG. 4B).

The conventional image display apparatus is provided as set forth above. Consequently, there is a problem in that, when the frequency of the horizontal synchronizing signal H in an input signal increases, the size of the displayed character becomes large so that the number of characters which can be displayed on the display becomes smaller than the necessary number of characters to be displayed.

SUMMARY OF THE INVENTION

In view of the foregoing, it is an object of the present invention to provide an image display apparatus which can display the necessary number of characters by using a simple circuit configuration irrespective of whether the frequency of the horizontal synchronizing signal in the input signal is high or low.

To attain the above object there is provided, according to the first aspect of the present invention, an image display apparatus for displaying an image and characters superposed on the image, comprising a synchronizing signal dividing unit for dividing the frequency of an input synchronizing signal to generate a divided synchronizing signal, a character generating unit for generating, in response to the divided synchronizing signal, characters to be superposed on the image, and a character speed converting unit for converting the speed of the characters generated by the character generating means. Thereby, the number of characters outputted from the character speed converting unit in one synchronization period is made to be substantially constant regardless of the frequency of the input synchronizing signal.

The image display apparatus according to the first aspect of the present invention further comprises a control unit for generating control signals in response to a change of the frequency of the input synchronizing signal, a synchronizing signal switching unit for selecting, in response to one of the control signals, the input synchronizing signal or the divided synchronizing signal as a synchronizing signal to be applied to the character generating unit, and display data selecting unit for selecting, in response to another one of the control signals, the output of the character generating unit or the output of the character speed converting unit, as the character data to be displayed.

In the above-described image display apparatus, the input synchronizing signal is an input horizontal synchronizing signal.

In the above-described image display apparatus, the synchronizing signal dividing unit divides the input horizontal synchronizing signal to generate a divided horizontal synchronizing signal having a half frequency of the frequency of the input synchronizing signal.

The above described image display apparatus further comprises a clock signal generating unit for generating a basic clock signal applied to the character generating unit and to a write clock terminal of the character speed converting unit, and for generating a reading clock signal having a frequency two times as large as the frequency of the basic clock signal. The reading clock signal is applied to a read clock terminal of the character speed converting means. When the frequency of the input horizontal synchronizing signal is higher than or equal to a predetermined point, the synchronizing signal switching unit selects the divided horizontal synchronizing signal as the synchronizing signal to be applied to the character generating unit and to a write address reset terminal of the character speed converting unit, and the display data selecting unit selects the output of the character speed converting unit as the character data to be displayed. Whereas, when the frequency of the input horizontal synchronizing signal is lower than the predetermined point, the synchronizing signal switching unit selects the input horizontal synchronizing signal as the synchronizing signal to be applied to the character generating unit and to the write address reset terminal of the character speed converting unit, and the display data selecting unit selects the output of the character generating unit as the character data to be displayed.

In the above-described image display apparatus, the character generating unit generates, in response to the basic clock signal, a substantially constant number of characters within one horizontal synchronization period of the synchronizing signal applied to the character generating unit. The constant number of characters are written into the character speed converting unit in response to the basic clock signal and within one horizontal synchronization period of the synchronizing signal applied to the character generating unit. The character speed converting unit outputs the substantially constant number of characters in response to the reading clock signal within one horizontal synchronization period of the input horizontal synchronizing signal.

According to the second aspect of the present invention, the image display apparatus further comprises synchronizing signal processing unit for receiving the input synchronizing signal to detect a first synchronizing signal, and deflection processing unit for generating, in accordance with the frequency of the first synchronizing signal, a deflecting voltage for driving a deflecting coil of a cathode ray tube and for generating a second synchronizing signal synchronous with the deflecting voltage.

In the second aspect of the present invention, the input synchronizing signal to be divided by the synchronizing signal dividing unit is the second synchronizing signal.

Alternatively, the input synchronizing signal to be divided by the synchronizing signal dividing unit may be the first synchronizing signal.

According to the third aspect of the present invention, the image display apparatus comprises a control unit for generating control signals in response to a change of the frequency of the input synchronizing signal, a clock signal generating unit for generating a basic clock signal and a reading clock signal having a half frequency of the frequency of the basic clock signal, and clock signal switching unit for selecting, in response to one of the control signals, the basic clock signal or the reading clock signal as a clock signal to be applied to the character generating unit. The synchronizing signal dividing unit divides the input synchronizing signal to generate a divided synchronizing signal having a half frequency of the frequency of the input synchronizing signal. The divided synchronizing signal is always applied to the character generating means.

In the third aspect of the present invention, when the frequency of the input synchronizing signal is higher than or equal to a predetermined point, the clock signal switching unit selects the basic clock signal as the clock signal to be applied to the character generating means; and when the frequency of the input synchronizing signal is lower than the predetermined point, the clock signal switching unit selects the reading clock signal as the clock signal to be applied to the character generating means. The input synchronizing signal, the divided synchronizing signal, the basic clock signal, and the reading clock signal are always applied to a read address reset terminal, a write address reset terminal, a write clock terminal, and a read clock terminal of the character speed converting unit, respectively.

In the first to third aspects of the present invention, the character speed converting unit is a one line memory of a first-in first out type.

In the first to third aspects of the present invention, the image display apparatus further comprises image signal processing unit for processing an image signal included in an input signal, the input signal including the input synchronizing signal.

As seated above, according to the present invention, in the case where the frequency of the horizontal synchronizing signal is higher than or equal to the predetermined point, a predetermined point is set with respect to the frequency of the horizontal synchronizing signal in an input signal to reduce the frequency of the horizontal synchronizing signal fed into a character generating unit so as to provide an apparent low frequency of the horizontal synchronizing signal. In contrast, in the case where the frequency of the horizontal synchronizing signal is lower than the predetermined point, the frequency of the inputted horizontal synchronizing signal is fed into a circuit of the display character generating unit as it is. Therefore, it is possible to display the substantially constant number of display characters in either case of high frequency or low frequency of the horizontal synchronizing signal.

Further, a frequency of a character generating horizontal synchronizing signal is switched by a horizontal synchronizing signal switching unit. Then, the speed of the character data generated synchronously with the horizontal synchronizing signal having the converted low frequency is doubled by the character speed converting unit so that the frequency of the output synchronizing signal returns to the original frequency.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DESCRIPTION OF THE PREFERRED EMBODIMENTS

Embodiment 1

A description will now be given of embodiments of the present invention with reference to the drawings.

Figure 5:
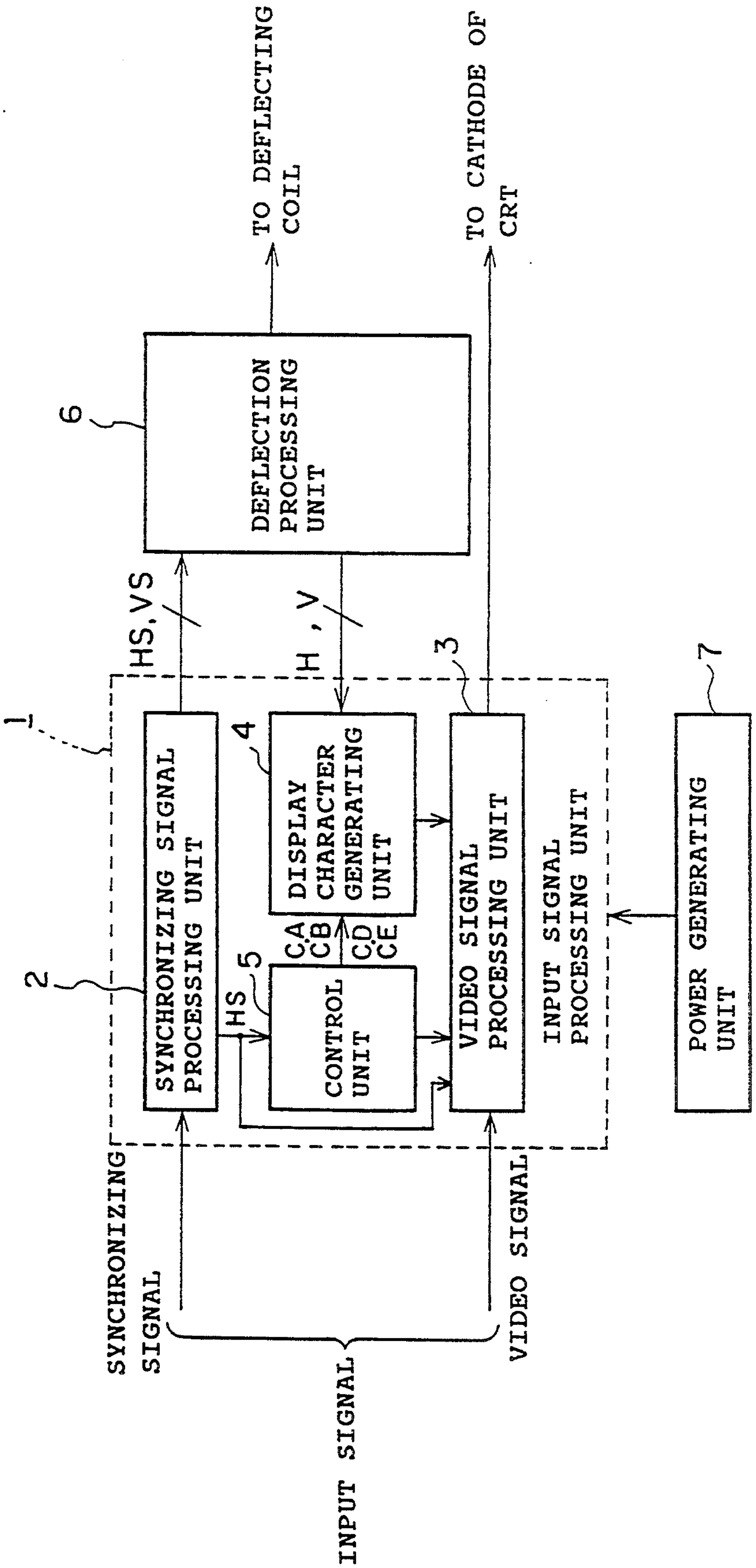
FIG. 5 is a block diagram showing an image display apparatus according to a first embodiment of the present invention.

FIG. 5 is a block diagram showing a main portion of an image display apparatus according to an embodiment of the present invention. In FIG. 5, reference numeral 1 means an input signal processing unit for processing an externally inputted signal including a synchronizing signal and a video signal. The input signal processing unit includes a synchronizing signal processing unit 2, a video signal processing unit 3, a display character generating unit 4, and a control unit 5. Reference numeral 6 means a deflection processing unit to generate a power (voltage) for deflecting an electronic beam of a CRT display tube (not shown) on the basis of a horizontal synchronizing signal HS and a vertical synchronizing signal VS fed from the input signal processing unit 1 so as to activate a deflecting coil. Reference numeral 7 is a power generating unit for supplying power to each unit. The synchronizing signal processing unit 2 in the input signal processing unit 1 divides the synchronizing signal in the input signal into the horizontal synchronizing signal HS and the vertical synchronizing signal VS. The video signal processing unit 3 processes the video signal in the input signal so as to be able to be displayed. The display character generating unit 4 generates characters to be displayed and superimposed on the video signal, such as characters indicating, for example, an adjustment item to adjust an image displayed on the image display apparatus. The control unit 5 controls all elements constructing the image display apparatus (including other processing units which are not shown in FIG. 5).

A description will now be given of the operation. In the image display apparatus, the input signal includes the synchronizing signal and the video signal which are separately processed in the image display apparatus (see FIG. 5). In case the image display apparatus employs an input signal mode in which the video signal and the synchronizing signal are mixed, the input signal processing unit 1 separates the input signal into a synchronizing signal and a video signal which are respectively inputted to the synchronizing signal processing unit 2 and the video signal processing unit 3. The synchronizing signal processing unit 2 separates the synchronizing signal into a horizontal synchronizing signal HS and a vertical synchronizing signal VS.

The horizontal synchronizing signal HS and the vertical synchronizing signal VS outputted from the synchronizing signal processing unit 2 are inputted into the deflection processing unit 6. The horizontal synchronizing signal HS is also given from the synchronizing signal processing unit 6 to the control unit 5. The deflection processing unit 6 generates a deflecting voltage depending upon the synchronizing signals. Concurrently, the deflection processing unit 6 supplies the display character generating unit 4 with a second horizontal synchronizing signal H and a second vertical synchronizing signal V which are completely synchronized with the input signal. The display character generating unit 4 employs the same operating principle in display character generation as that described above with respect to the Prior Art.

The display character generating unit 4 outputs display character data to the video signal processing unit 3 in which the display character data is superimposed on the video signal inputted into the image display apparatus. The superimposed signal is outputted to a cathode of the CRT display tube. Thus, in the outputted image, the characters are superimposed on the image.

A description will now be given of the principle according to the present invention to provide a substantially constant number of characters which can be displayed during one horizontal synchronization period irrespective of the frequency of the horizontal synchronizing signal HS in the input signal.

In FIG. 5, it is assumed that the horizontal synchronizing signal HS obtained by the synchronizing signal processing unit 2 from the input signal inputted into the image display apparatus has a frequency $f_{H1}$. Then, the second horizontal synchronizing signal H outputted from the deflection processing unit 6 has a frequency identical with $f_{H1}$. That is, the horizontal synchronizing signal H input ted into the display character generating unit 4 has the frequency $f_{H1}$.

On the other hand, it is assumed that the dot clock signal (or, in other words, the basic clock signal) C' inputted into the display character generating IC 41 has a frequency $f_C$. The image display apparatus according to the embodiment of the present invention is an automatic scanning type display monitor which can display an image by a horizontal synchronizing signal having a frequency in the range between, for example, 15 kHz and 90 kHz. That is, a horizontal pull-in operation can be performed in the range of 15 kHz to 90 kHz.

Therefore, the frequency of the horizontal synchronizing signal extracted from the input signal may be changed in the above-mentioned range. To make the number of characters which can be displayed within one horizontal synchronization period to be substantially constant regardless of the frequency of the horizontal synchronizing signal. That is, according to the present invention, when the horizontal synchronizing signal has a relatively higher frequency, the frequency is divided into two or the like. The divided horizontal synchronizing signal is inputted to the display character generating IC 41. The basic clock signal C' is also applied to the display character generating IC 41. Thus, the period of the horizontal synchronizing signal applied to the display character generating IC 41 is seemingly elongated so that a larger number of characters are displayed during one horizontal synchronization period.

In the image display apparatus according to this embodiment, a predetermined point is set with respect to the frequency of the horizontal synchronizing signal HS extracted from the input signal. When the frequency of the horizontal synchronizing signal HS in the input signal is lower than the predetermined point p, the display character generating operation is the same as that in the conventional image display apparatus. When the frequency of the horizontal synchronizing signal HS is higher than the predetermined point p, however, the image display apparatus is operated to divide the frequency of the second horizontal synchronizing signal H inputted into the display character generating unit 4 in half so as to generate, according to the divided frequency, characters to be displayed.

The control unit 5 in the image display apparatus in FIG. 5 judges whether the frequency of the horizontal synchronizing signal HS in the input signal is higher than or equal to or lower than the predetermined point. As a result of the judgement, the control unit 5 generates control signals CA, CB, and CD which are applied to the display character generating unit 4. Independent from the above judgement, the control unit 5 also generates another control signal CC for designating a character to be displayed. The control signal CC is also supplied to the display character generating unit 4.

Figure 1:
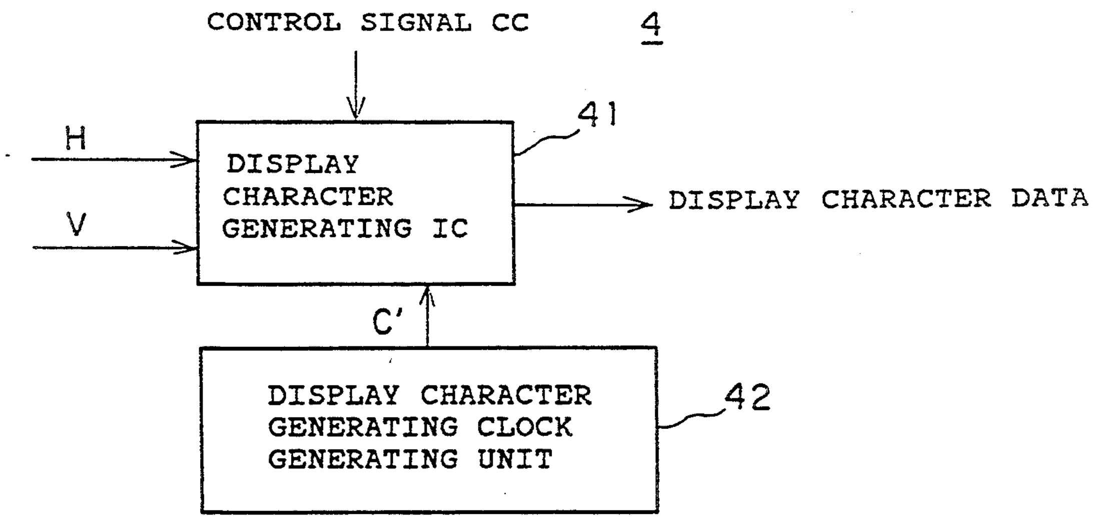
FIG. 1 (PRIOR ART)
FIG. 1 is a block diagram showing a conventional display character generating unit.
Figure 2A:
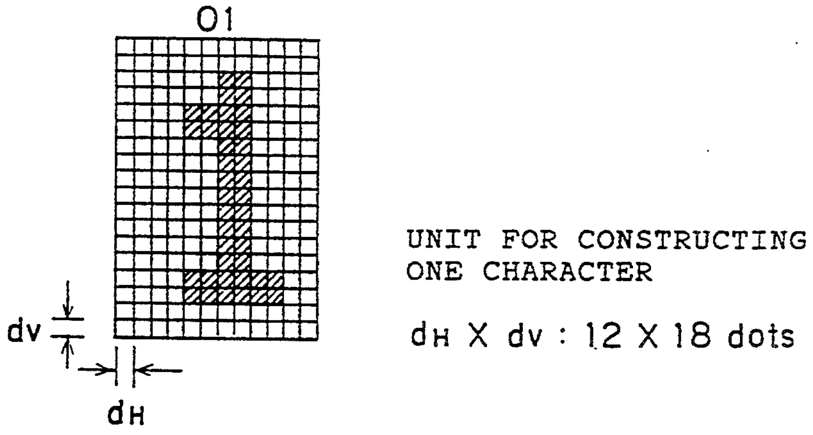
FIG. 2A (PRIOR ART)
FIG. 2A and FIG. 2B are conceptual diagrams showing a configuration of the displayed character data.
Figure 2B:
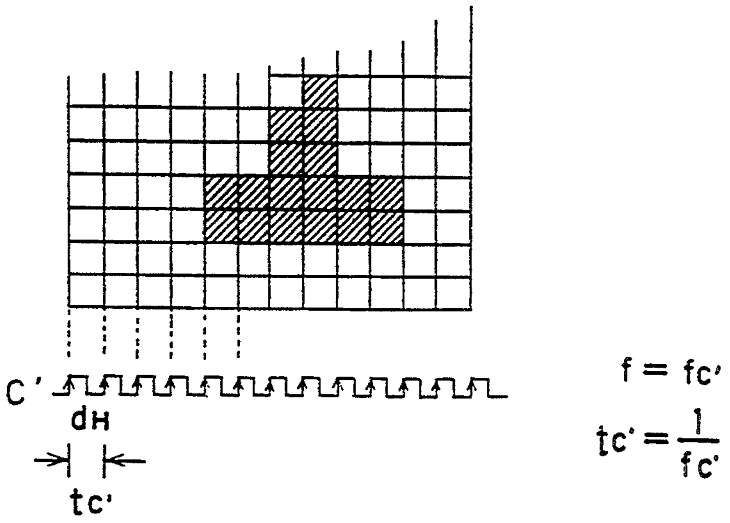
FIG. 2B (PRIOR ART)
Figure 3A:
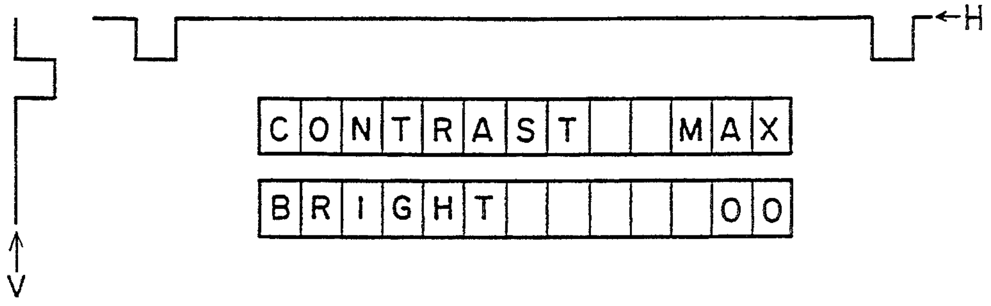
FIG. 3A (PRIOR ART)
FIG. 3A, FIG. 3B, and FIG. 3C are timing diagrams showing a relationship between the displayed characters and the frequency of the clock signal for generating characters.
Figure 3B:
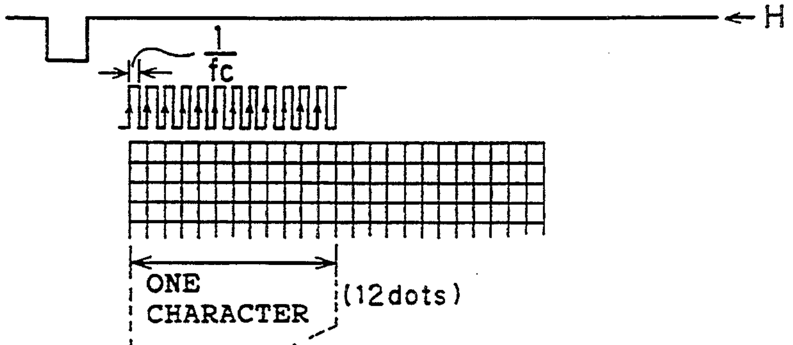
FIG. 3B (PRIOR ART)
Figure 3C:
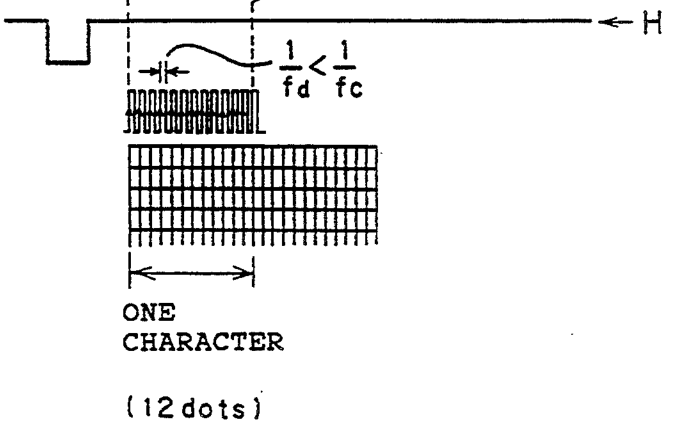
FIG. 3C (PRIOR ART)
Figure 4A:
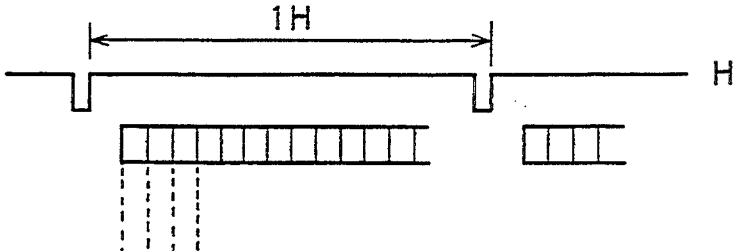
FIG. 4A (PRIOR ART)
FIG. 4A and FIG. 4B are timing diagrams showing the concept of the conventional display character generation.
Figure 4B:
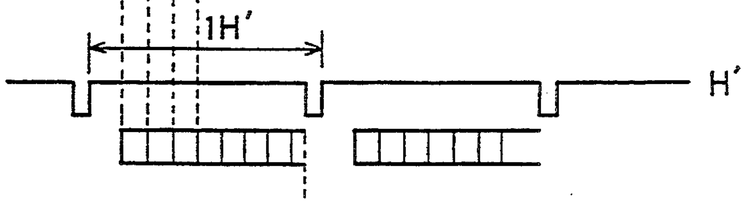
FIG. 4B (PRIOR ART)
Figure 6:
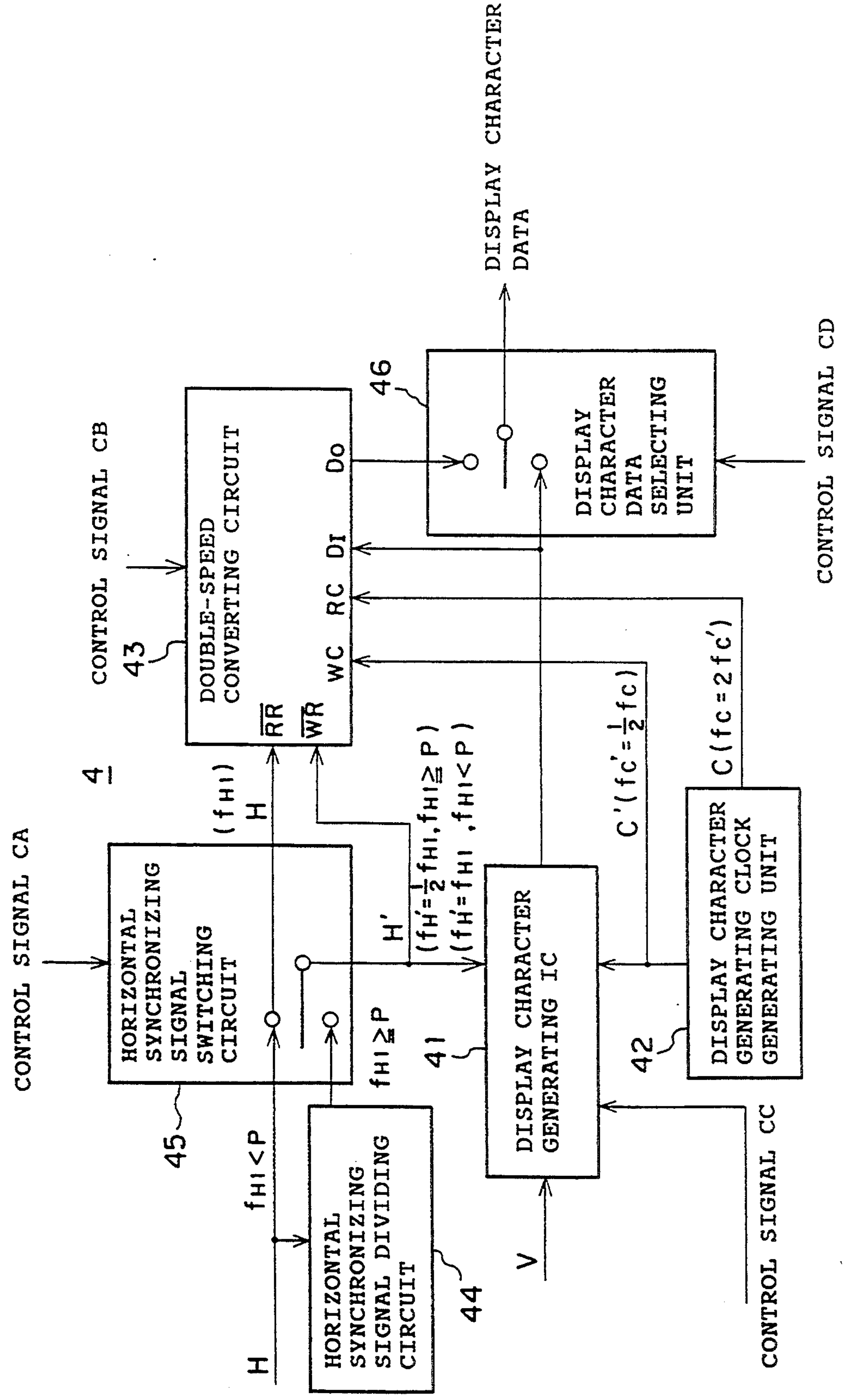
FIG. 6 is a detailed block diagram showing a display character generating unit in the embodiment in FIG. 5.

FIG. 6 is a block diagram showing in detail an essential part of the display character generating unit 4. In FIG. 6, the display character generating IC 41 and the clock signal generating unit 42 are identical with those shown in FIG. 1; reference numeral 43 means the double-speed converting circuit for converting the speed of a character data to be displayed to be twice as high as the speed of the character data input to the double-speed converting circuit 43; 44 is a horizontal synchronizing signal dividing circuit; 45 is the horizontal synchronizing signal switching circuit for switching the frequency of the second horizontal synchronizing signal H; and 46 is the display character data selecting unit for selecting the output $D_O$ of the double-speed converting circuit 43 or the output of the display character generating IC 41 as the data of a character to be displayed. The control unit 5 in FIG. 5 supplies the control signals CA, CB, CC, and CD to the horizontal synchronizing signal switching circuit 45, the double-speed converting circuit 43, the display character generating IC, and the display data selecting unit 46, respectively.

In a case where the horizontal synchronizing signal HS in input signal inputted into the control unit 5 has a frequency $f_{H1}$ higher than or equal to the predetermined value set in the image display apparatus, the horizontal synchronizing signal switching circuit 45 selects, in response to the control signal CA, the output of the horizontal synchronizing signal dividing circuit 44 as a horizontal synchronizing signal H' to be supplied to the display character generating IC 41. The dividing circuit 44 outputs a signal having a frequency $(\frac{1}{2})f_{H1}$ which is obtained by dividing the frequency $f_{H1}$ in half. The horizontal synchronizing signal H' is inputted into the display character generating IC 41 and to write address reset terminal (active low) in the double-speed converting circuit 43.

At this time, by using the equation (1), the maximum number nut of characters which can be horizontally displayed during one horizontal synchronization period can be expressed as follows:

$$n_{H1} = \frac{\frac{1}{\frac{1}{2} f_{H1}}}{\frac{1}{f_C} \times 12} = \frac{2 \times f_C}{12 \times f_{H1}} \quad (5)$$

Here, since the horizontal synchronizing signal H' inputted into the display character generating IC 41 has a frequency obtained by dividing the frequency $f_{H1}$ in half, the display character data outputted from the display character generating IC 41 synchronizes with ($\frac{1}{2}$) $f_{H1}$. However, the horizontal synchronizing signal HS inputted into the image signal processing unit 3 has a frequency $f_{H1}$. Consequently, in order to synchronize the characters to be displayed with an image signal having the frequency $f_{H1}$ of the horizontal synchronizing signal HS, it is also necessary to adjust the frequency of the horizontal synchronizing signal of the display character data outputted from the display character generating unit 4 to the frequency $f_{H1}$, that is, to double the divided frequency so as to provide an original frequency.

Thus, the double-speed converting circuit 43 is operated so as to carry out the double-speed conversion of the display character data outputted from the display character generating IC 41 by the control signal CB supplied from the control unit 5 in FIG. 5. Here, the control signal CB is a selecting signal to select whether the double-speed converting circuit 43 is valid or invalid.

A description will now be given of the double-speed converting circuit 43. The double-speed converting circuit 43 has one line memory (FIFO). Data can be written in the line memory in synchronization with a certain clock signal, and the written data can be read in synchronization with another clock signal.

That is, in FIG. 6, a signal to control writing in the line memory of the double-speed converting circuit 43, namely, the write address reset signal WR (active low) and a write clock signal WC respectively correspond to the horizontal synchronizing signal H' outputted from the horizontal synchronizing signal switching circuit 45, and to the dot clock signal C' outputted from the clock signal generating unit 42.

On the other hand, signals to control a reading operation from the line memory, that is, a read address reset signal RR (active low) and a read clock signal RC respectively correspond to the second horizontal synchronizing signal H inputted into display character generating unit 4 and to a read clock signal C outputted from the clock signal generating unit 42 and having a frequency $f_C$ which is double of the frequency $f_{C'}$ of the basic clock signal C'.

As set forth above, it is assumed that the frequency $f_{H1}$ of the horizontal synchronizing signal H inputted to the display character generating unit 4 is higher than or equal to the predetermined value. Therefore, in FIG. 6, the display character generating IC 41 is supplied with the horizontal synchronizing signal H' having the frequency $f_{H'}=(\frac{1}{2})f_{H1}$ which is selected in response to the control signal CA by the horizontal synchronizing signal switching circuit 45. On the other hand, in response to the control signal CB, the double-speed converting circuit 43 is made valid.

At this time, the maximum number $n_{H1}$ of characters in one horizontal synchronization period in the horizontal direction which can be outputted from the display character generating IC 41 is given from the equation (4) as follows:

$$n_{H1} = \frac{2 \times f_C}{12 \times f_{H1}} \quad (6)$$

The write address is reset in response to the low level of the horizontal synchronizing signal H'. The display character data outputted from the display character generating IC 41 is sequentially written in the data input terminal $D_1$ of the line memory in synchronization with the write dot clock signal C'. In this case, as described above, the frequency $f_{H'}$ of the horizontal synchronizing signal H' is ($\frac{1}{2}$)$f_{H1}$ corresponding to half of the frequency $f_{H1}$ of the input signal.

Next, in FIG. 6, the display character data, written in the line memory of the double-speed converting circuit 43 in accordance with the frequency ($\frac{1}{2}$)$f_{H1}$ and the timing of the dot clock signal C', is sequentially read in synchronization with the read clock signal C. Note that the read address has been reset according to the low level of the second synchronizing signal H.

In the reading operation, the display character data is read in response to the read clock signal C having the clock frequency $f_C=2f_{C'}$, i.e., having a frequency two times as large as the frequency of the dot clock signal C' in writing. Thus, the horizontal synchronizing signal of the read display character data has the frequency two times as large as the frequency in writing, that is, has a frequency $2f_{H'}(=f_{H1})$. This frequency $2f_{H'}$ is the same as the frequency $f_{H1}$ of the horizontal synchronizing signal HS inputted into the image display apparatus. Accordingly, the displayed character is in synchronization with the image signal.

As set forth above, the horizontal synchronizing signal H inputted into the display character generating unit 4 is divided into the horizontal synchronizing signal H' having the frequency which is half of the frequency of the signal H; the display character data is generated in synchronization with the divided horizontal synchronization signal H'; and the display character data is read from the double-speed converting circuit 43 in response to the clock signal having the frequency $f_C$ which is twice as much as the basic clock frequency $f_{C'}$, thereby the frequency of the horizontal synchronizing signal for the read out data $D_O$ becomes twice as much as the frequency $f_{H'}$ of the horizontal synchronizing signal for the write data $D_I$. That is, the horizontal synchronizing signal is changed to the original state.

Figures 7A, 7B, 7C:
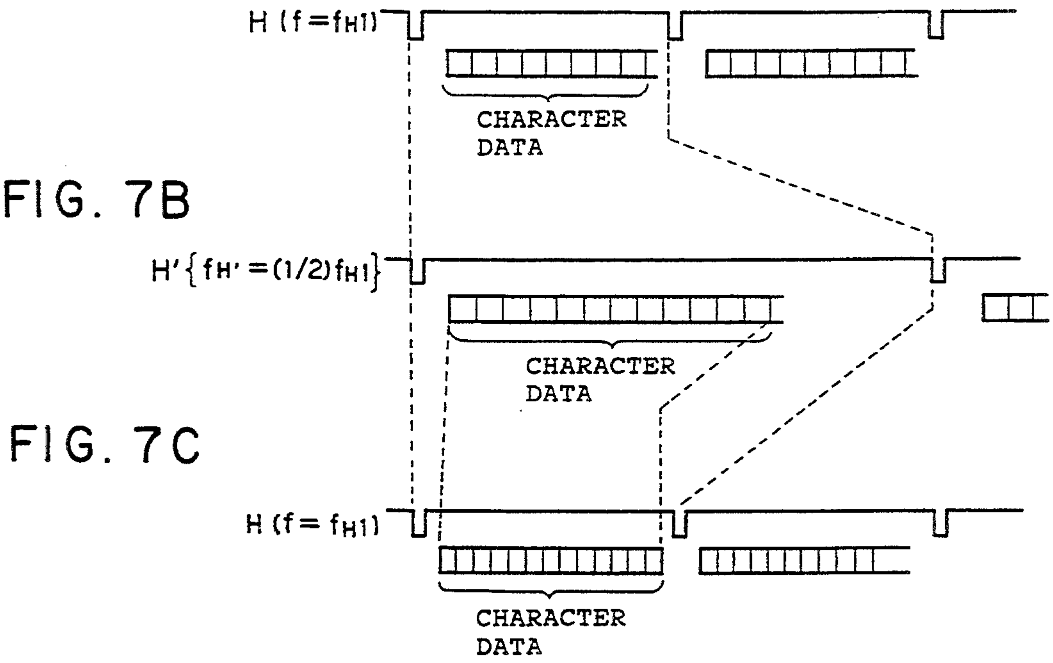
FIG. 7A to FIG. 7C are timing diagrams showing the concept of the generation of the displayed character according to the first embodiment of the present invention.

FIG. 7A to FIG. 7C are timing diagrams showing the concept of the above operation.

FIG. 7A shows the horizontal synchronizing signal H having the frequency $f_{H1}$ inputted to the display character generating unit 4 and the display character data. FIG. 7B shows the horizontal synchronizing signal H' whose frequency $f_{H'}$ is obtained by dividing the frequency $f_{H1}$ in half according to the operation in the embodiment of the present invention, and shows the display character data generated in synchronization with the horizontal synchronizing signal H'. FIG. 7C shows the horizontal synchronizing signal H which is restored to have the same frequency $f_{H1}$ as that of the input signal by the double-speed converting operation in the embodiment of the present invention, and shows the display character data after the double-speed conversion.

At this time, when the number of display characters written in the line memory is N, the number of display characters read from the line memory is also N.

A description has been given of a circuit operation in the case where the frequency of the horizontal synchronizing signal H inputted into the display character generating unit 4 is higher than or equal to the predetermined point. On the other hand, in a case where the frequency of the horizontal synchronizing signal H inputted into the display character generating unit 4 is lower than the predetermined point p, the display character generating operation is carried out as in the case of the conventional image display apparatus as mentioned before. In this case, the control unit 5 controls the horizontal synchronizing signal switching circuit 45 by the control signal CA to select the horizontal synchronizing signal H, makes the double-speed converting circuit 43 to be inoperative by the control signal CB, and controls the display character data selecting unit 46 by the control signal CD to output the output of the character generating IC 41 as it is. In FIG. 6, when the frequency of the horizontal synchronizing signal H at this time is defined as $f_{H2}$, the horizontal synchronizing signal H' inputted into the display character generating IC 41 is the same as the horizontal synchronizing signal H, and has a frequency $f_{H'}$ identical with $f_{H2}$.

A description will now be given of the number of display characters in this case.

When the horizontal synchronizing signal H has a frequency $f_{H2}$ which is lower than the predetermined point p, the maximum number $n_{H2}$ of characters which can be horizontally displayed in one horizontal synchronization period can be derived from the equation (1) as follows:

$$n_{H2} = \frac{\frac{1}{f_{H2}}}{\frac{1}{f_C} \times 12} = \frac{f_C}{12 \times f_{H2}} \tag{7}$$

On the other hand, when the horizontal synchronizing signal H in the input signal has a frequency $f_{H1}$ which is higher than the predetermined point p, the maximum number of characters which can be horizontally displayed within one horizontal synchronization period can be given as follows:

$$n_{H1} = \frac{2 \times f_C}{12 \times f_{H1}} \tag{8}$$

Let assume that the frequency $f_{H1}$ higher than the predetermined point p is about twice as much as the frequency $f_{H2}$ lower than the predetermined point p, as expressed in the following expression:

$$2f_{H2} \approx f_{H1} \tag{9}$$

Then, the equation (8) can be rewritten as follows:

$$n_{H1} = \frac{2 \times f_C}{12 \times f_{H1}} \approx \frac{2 \times f_C}{12 \times 2f_{H2}} \approx \frac{f_C}{12 \times f_{H2}} \tag{10}$$

That is, the following relation can be obtained:

$$n_{H1} \approx n_{H2} \tag{11}$$

Consequently, according to the present invention, it is possible to provide substantially the same number of display characters within one horizontal synchronization period in either case of the high frequency or the low frequency of the horizontal synchronizing signal H inputted into the image display device.

In the above embodiment, it must be noted that the display character generating clock signal generating unit 42 may employ a ceramic vibrator, a crystal vibrator, an LC oscillator, or an RC oscillator in order to generate the basic clock signal C'.

Figure 8A:
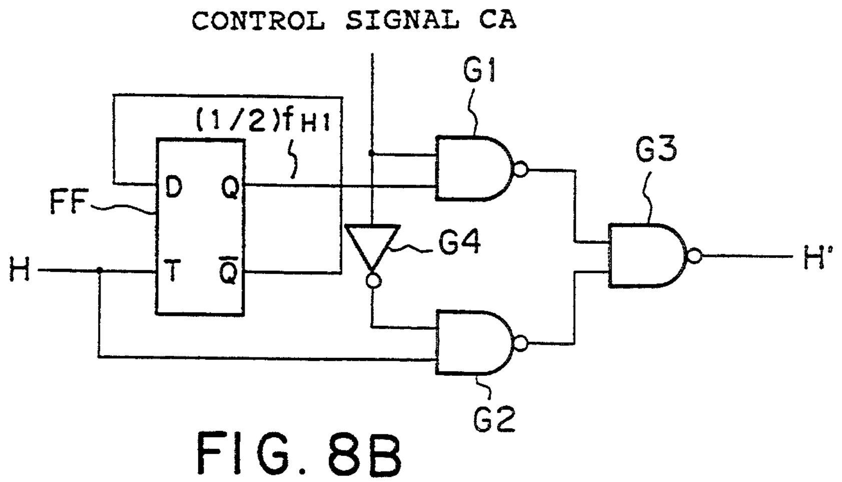
FIG. 8A to FIG. 8C are logic circuit diagrams each showing a horizontal synchronizing signal switching circuit included in the image display apparatus according to the first embodiment of the present invention.
Figure 8B:
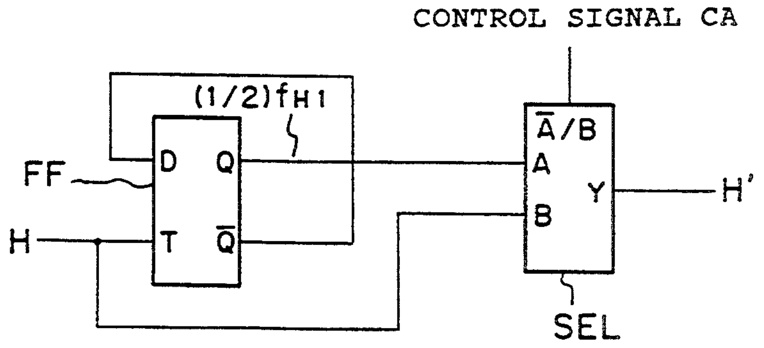
Figure 8C:
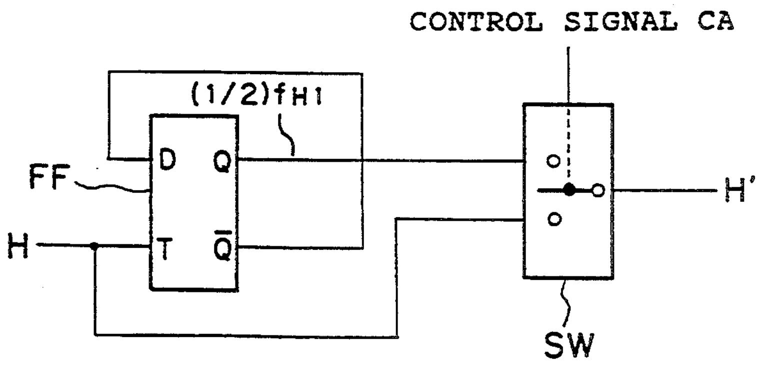

The horizontal synchronizing signal switching circuit 45 in the embodiment 1 may employ one of the circuits shown in FIG. 8A to FIG. 8C. That is, FIG. 8A shows a circuit in which a flip-flop circuit FF is combined with NAND gates G1 to G3 and an inverter G4; FIG. 8B shows a circuit in which the flip-flop circuit FF is combined with a selector circuit SEL; and FIG. 8C shows a circuit using an analog switch SW. In either one of the circuits shown in FIGS. 8A to FIG. 8C, the frequency $f_{H1}$ of the horizontal synchronizing signal H is divided, by the flip-flop circuit FF, in half to provide a horizontal synchronizing signal H' having a half frequency $(\frac{1}{2})f_{H1}$, and the horizontal synchronizing signal H or H' is selected in response to the control signal CA.

Embodiment 2

In the embodiment 1, a description has been given of two cases. In one case, when the frequency of the horizontal synchronizing signal in the input signal is higher than or equal to the predetermined point p, the frequency of the horizontal synchronizing signal H inputted to the display character generating unit: 4 is divided in half and is supplied to the display character generating IC 41. In the other case, when the frequency of the horizontal synchronizing signal in the input signal is lower than the predetermined value, the frequency of the horizontal synchronizing signal H is not divided but is supplied as it is to the display character generating IC 41.

Figure 9:
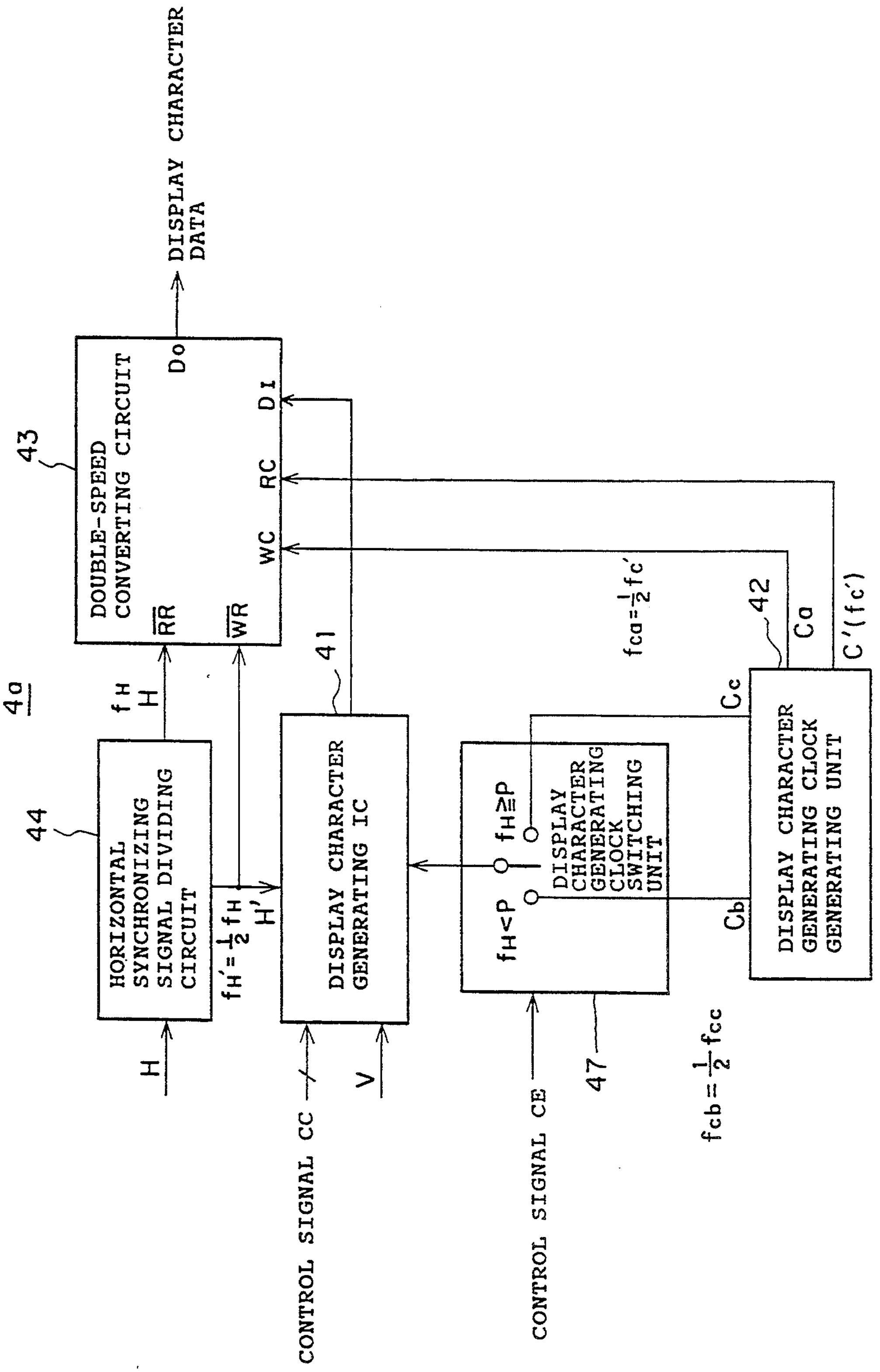
FIG. 9 is a block diagram of a display character generating unit included in an image display apparatus according to a second embodiment of the present invention.

Alternatively, the frequency of the horizontal synchronizing signal H may always be divided in half and a period of the clock signal supplied to the display character generating IC 41 may be switched. FIG. 9 is a block diagram of a display character generating unit 4a according to the second embodiment of the present invention. In the drawing, reference numeral 47 means a display character generating clock switching unit to select high-frequency clock signal $C_C$ or a low-frequency clock signal $C_b$ as the reading clock signal applied to the display character generating IC 41 depending on whether the frequency of the input horizontal synchronizing signal is higher than or lower than the predetermined point p, respectively. In this embodiment, the frequency $f_{cb}$ is, for example, a half of the frequency $f_{CC}$ of the high-frequency clock signal $C_C$.

Figure 13A:
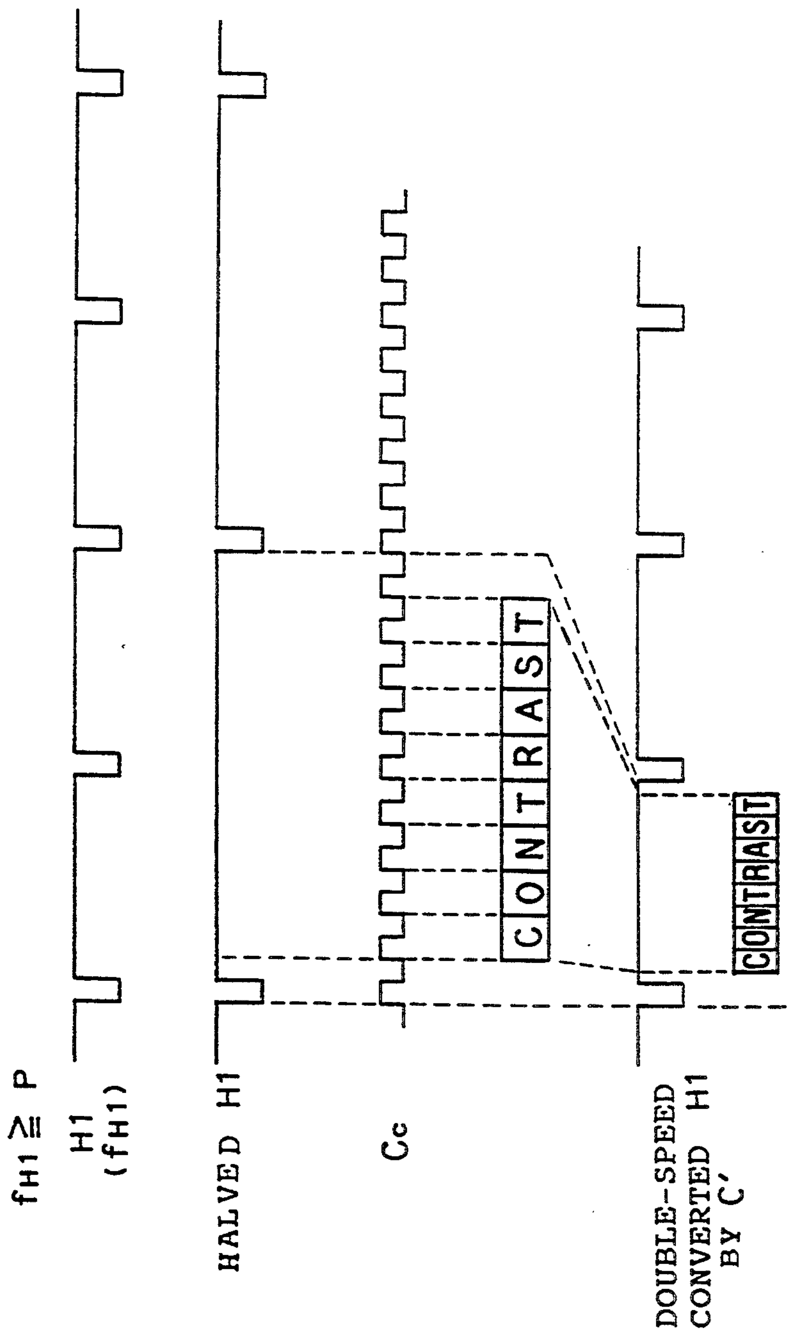
FIG. 13A and FIG. 13B are time charts explaining the operation of the display character generating unit 4*a* shown in FIG. 9.
Figure 13B:
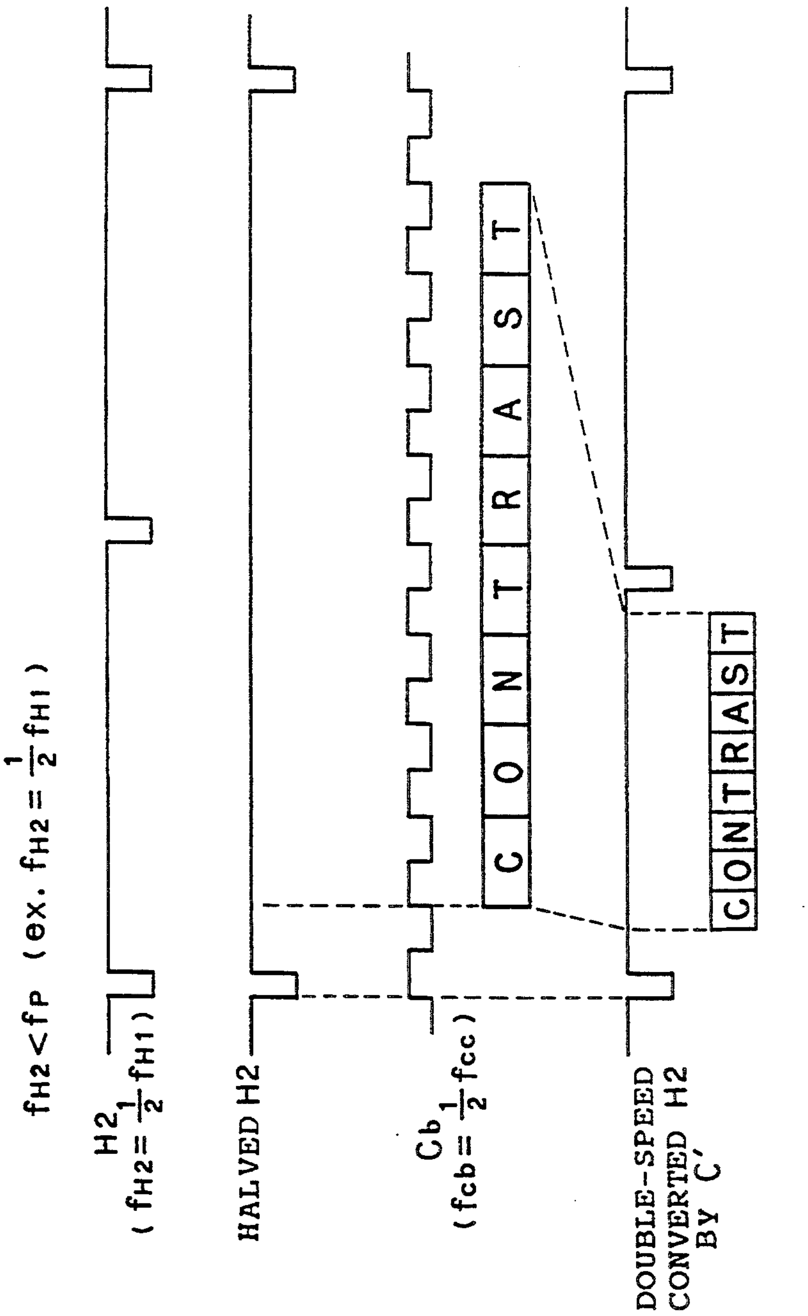

FIG. 13A and FIG. 13B are time charts explaining the operation of the display character generating unit 4a shown in FIG. 9. In operation, when the frequency $f_{H1}$ of the horizontal synchronizing signal H1 in the input signal is higher than or equal to the predetermined point p, as shown in FIG. 13A, the control unit 5 generates a control signal CE to select the high-frequency clock signal $C_{CC}$ to be supplied to the display character generating IC 41.

The generated character data is written into the double-speed converting circuit 43 in response to a half clock signal $C_a$ having a frequency $f_{ca}$. In the reading operation, the data written in the double-speed converting circuit 43 is read in response to the basic clock signal C' having a frequency $f_{C'}$ equal to $2f_{ca}$.

When the frequency $f_{H2}$ of the horizontal synchronizing signal H2 in the input signal is lower than the predetermined point p, as shown in FIG. 13B, the control unit 5 generates the control signal CE to select the low-frequency clock signal $C_b$ as a clock signal to generate characters from the display character generating IC 41. The writing clock signal $C_a$ and the reading clock signal C' for the double-speed converting circuit 43 are the same as those in the case where the frequency $f_H$ of the horizontal synchronizing signal HS in the input signal is higher than or equal to the predetermined point.

In both cases, the number of characters which can be displayed in one synchronization period is substantially the same.

It should be noted that, as the high-frequency clock signal $C_b$, the basic clock signal C' may be used to obtain the same effect as above.

Embodiment 3

In the above-described embodiments, the display character generating IC 41 generates characters to be displayed in response to the frequency of the second horizontal synchronizing signal H supplied from the deflection control unit 6. However, according to the third embodiment of the present invention, it may also be possible to generate the characters to be displayed in response to the first synchronizing signal HS supplied from the synchronizing signal processing unit 2.

Before explaining the third embodiment, the various signals at respective points in the input signal processing unit 1 shown in FIG. 5 are described with reference to FIG. 10A to FIG. 10G.

Figure 10A:
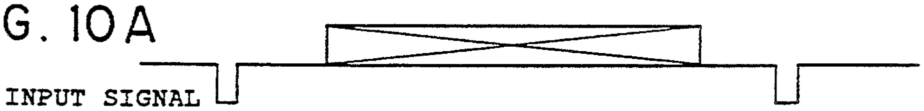
FIG. 10A to FIG. 10G are diagrams showing various signals at various points in the image display apparatus shown in FIG. 5.

FIG. 10A shows the input signal (a) including synchronizing signals and a video signal applied to the input signal processing unit 1.

Figure 10B:
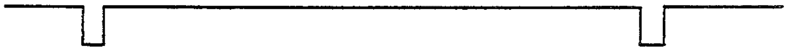

FIG. 10B shows the first horizontal synchronizing signal HS detected by the synchronizing signal processing unit 2.

Figure 10C:
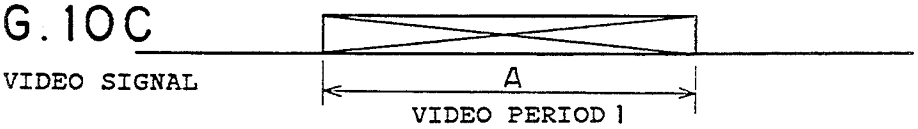

FIG. 10C shows the video signal (c) included in the input signal. The video signal (c) is present in a video signal period 1 in which the video data A is included.

Figure 10D:
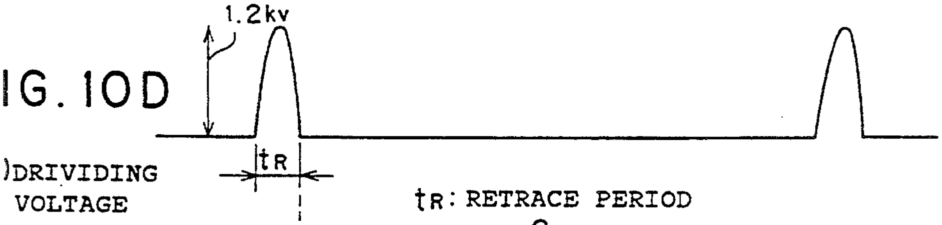

FIG. 10D shows a voltage (d) for driving the deflection coil. The driving voltage is generated in the deflection processing unit 6 on the basis of the first horizontal synchronizing signal HS. A Lime period $t_B$ of each pulse of the driving voltage is the blanking period (or the retrace period). The other period between the pulses is referred to as a video period 2. The video period 2 corresponds to a display effective area and is a period in which the video signal (c) in the input signal can be displayed. In the electrical meaning, the video period 2 is a period in which electron beams emitted from the cathode of the CRT are scanned. The video period 2 is referred to as a back raster.

Figure 10E:
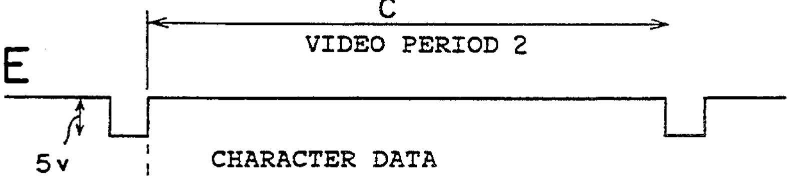

FIG. 10E shows the second synchronizing signal H which is obtained by converting the driving voltage (d) shown in FIG. 10D to have a level of, for example, 5V which is convenient for the later stage circuits. This second synchronizing signal. It is supplied to the display character generating IC 41.

Figure 10F:
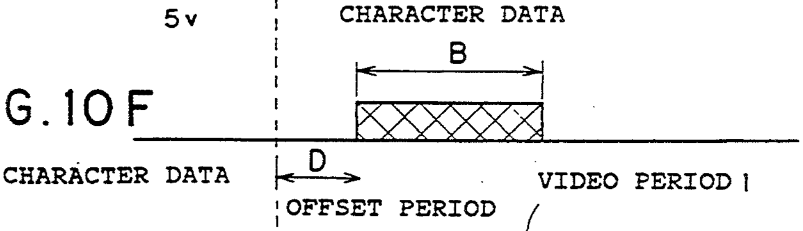
Figure 10G:
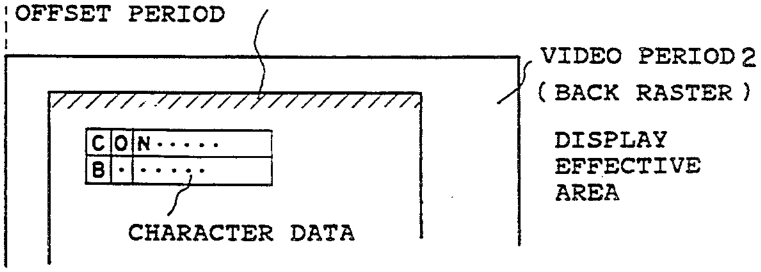

FIG. 10F shows the character data. B generated by the display character generating IC 41. An offset period D follows after the trailing edge or the rising edge of the pulse of the second synchronizing signal H shown in FIG. 10E, and then the character data is displayed after the offset period D.

The offset period D, the character data B to be displayed, and the character display period are specified by the control data CC given by the control unit 5.

On the basis of the above description with reference to FIG. 10A to FIG. 10F, a description will be given For the two cases, i.e, the case in which the first horizontal synchronizing signal HS is applied from the synchronizing signal processing unit 2 to the display character generating IC 41, and the case in which the second horizontal synchronizing signal H is applied from the deflection processing unit 6 to the display character generating IC 41.

In both cases, it should be noted that the position relationship between the first synchronizing signal HS and the video signal is not changed.

Figure 11:
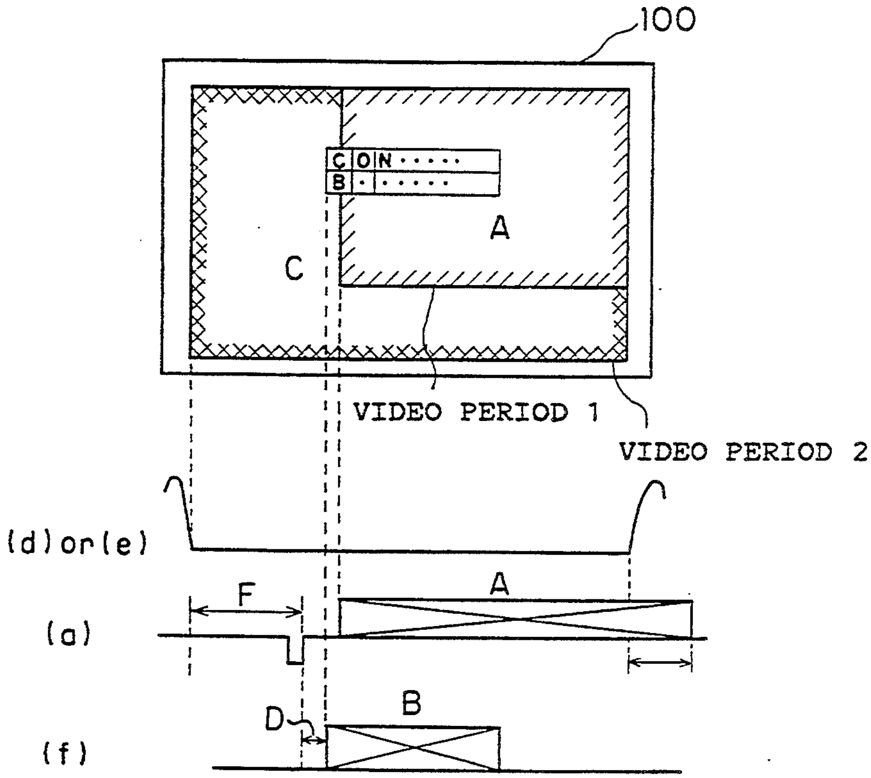
FIG. 11 is a diagram showing a displayed image and characters when the synchronizing signal HS is supplied from the synchronizing signal processing unit 2 to the display character generating unit 4 according to a third embodiment of the present invention.

In the first case when the first synchronizing signal HS is applied from the synchronizing signal processing unit 2 to the control unit 5, the video data A in the video period 1 can 10 be displayed at any place as long as it is within the video period 2. FIG. 11 shows an example in which the video data A is displayed on the left side in the video period 2. As shown in the time charts (d) and (a) in FIG. 11, a part E in the video data A is out of the video period 2 which is the display effective area so that the part E is not displayed.

Figure 12:
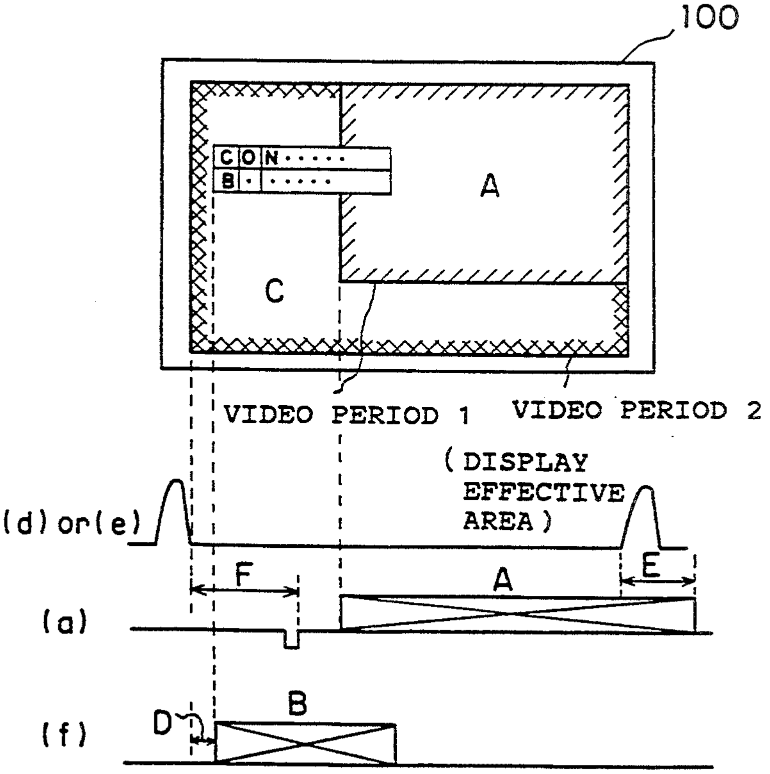
FIG. 12 is a diagram showing displayed image and characters when the synchronizing signal H is supplied from the deflection processing unit 6 to the display character generating unit 4 according to the First embodiment of the present invention.

The display position of the video data A can be changed by controlling the phase of the voltage (d) for driving the deflection coil, namely, by changing a period F in FIG. 12. This operation is one of the basic circuit operations of the image display apparatus according to the present invention.

It is assumed here that the character data B is displayed at the position separated from the first synchronizing signal HS by the offset D, as shown in FIG. 11. In this case, when the position of the video data A is changed, the position of the character data B is also changed because the position of the character data is determined by the offset period D which is determined in response to the trailing edge of the first synchronizing signal HS as mentioned before. This simultaneous change of the positions of the video data and the character data is not always desirable.

By contrast, in the second case when the second horizontal synchronizing signal H is applied from the deflection processing unit 6 to the control unit 5, although the display operation of the video data A is the same as the operation in the above case, the display operation of character data B is different.

It is assumed here that the character data B is displayed at the position separated from the second synchronizing signal H or the falling edge of the deflecting voltage (d) by the offset D, as shown in FIG. 12. In this case, even when the position of the video data A is changed, the position of the character data B is not changed because the position of the character data is determined by the offset period D which is determined with reference to the trailing edge of the second synchronizing signal H as mentioned before.

Accordingly, to avoid the change of the displaying position of the character data B when the displaying position of the video data A is changed, it is better to employ the second case in which the second synchronizing signal H is supplied to the display character generating IC 41.

In addition, in the second case, even when the input signal including the horizontal synchronizing signal HS and the vertical synchronizing signal VS are not inputted into the image display apparatus, the deflection processing unit 6 generate free-run synchronizing signals. Therefore, the display character generating unit 4 always receives the synchronizing signal so that the characters can be always displayed. If the synchronizing signal is not applied to the display character generating IC 41, it can not generate any character according to its character.

From the foregoing description, it will be apparent that, according to the present invention, in the case where the frequency of the horizontal synchronizing signal is higher than or equal to the predetermined point, a predetermined point is set with respect to the frequency of the horizontal synchronizing signal in an input signal to reduce the frequency of the horizontal synchronizing signal fed into a character generating unit so as to provide an apparent low frequency of the horizontal synchronizing signal. In contrast, in the case where the frequency of the horizontal synchronizing signal is lower than the predetermined point, the frequency of the inputted horizontal synchronizing signal is fed into a circuit of the display character generating unit as it is. Therefore, it is possible to display the substantially constant number of display characters in either case of high frequency or low frequency of the horizontal synchronizing signal.

Further, a frequency of a character generating horizontal synchronizing signal is switched by a horizontal synchronizing signal switching unit. Then, the speed of the character data generated synchronously with the horizontal synchronizing signal having the converted low frequency is doubled by the character speed converting unit so that the frequency of the output synchronizing signal returns to the original frequency.

What is claimed is:

1. An image display apparatus for displaying an image and characters superposed on said image comprising:

synchronizing signal dividing means for dividing the frequency of an input synchronizing signal to generate a divided synchronizing signal;

character generating means for generating, in response to said divided synchronizing signal, characters to be superposed on said image; and character speed converting means for converting the speed of the characters generated by said character generating means, such that the number of characters output from said character speed converting means in one synchronization period is substantially constant regardless of the frequency of the input synchronizing signal.

2. An image display apparatus as claimed in claim 1 further comprising:

control means for generating control signals in response to a change of the frequency of the input synchronizing signal;

synchronizing signal switching means for selecting, in response to one of said control signals, said input synchronizing signal or said divided synchronizing signal as a synchronizing signal to be applied to said character generating means; and display data selecting means for selecting, in response to another one of said control signals, the output of said character generating means or the output of said character speed converting means, as the character data to be displayed.

3. An image display apparatus as claimed in claim 2, wherein said input synchronizing signal is an input horizontal synchronizing signal.

4. An image display apparatus as claimed in claim 3, wherein said synchronizing signal dividing means divides said input horizontal synchronizing signal to generate a divided horizontal synchronizing signal having a half frequency of the frequency of said input synchronizing signal.

5. An image display apparatus as claimed in claim 4 further comprising clock signal generating means for generating a basic clock signal applied to said character generating means and to a write clock terminal of said character speed converting means, and for generating a reading clock signal having a frequency two times as large as the frequency of said basic clock signal, said reading clock signal being applied to a read clock terminal of said character speed converting means, wherein, when the frequency of said input horizontal synchronizing signal is higher than or equal to a predetermined point, said synchronizing signal switching means selects said divided horizontal synchronizing signal as the synchronizing signal to be applied to said character generating means and to a write address reset terminal of said character speed converting means, and said display data selecting means selects the output of said character speed converting means as the character data to be displayed; and when the frequency of said input horizontal synchronizing signal is lower than said predetermined point, said synchronizing signal switching means selects said input horizontal synchronizing signal as the synchronizing signal to be applied to said character generating means and to a write address reset terminal of said character speed converting means, and said display data selecting means selects the output of said character generating means as the character data to be displayed.

6. An image display apparatus as claimed in claim 5, wherein said character generating means generates, in response to said basic clock signal, a substantially constant number of characters within one horizontal synchronization period of the synchronizing signal applied to said character generating means, said constant number of characters being written into said character speed converting means in response to said basic clock signal and within one horizontal synchronization period of said synchronizing signal applied to said character generating means, and said character speed converting means outputs said substantially constant number of characters in response to said reading clock signal within one horizontal synchronization period of said input horizontal synchronizing signal.

7. An image display apparatus as claimed in claim 1 further comprising:

synchronizing signal processing means for receiving said input synchronizing signal to detect a first synchronizing signal; and deflection processing means for generating, in accordance with the frequency of said first synchronizing signal, a deflecting voltage for driving a deflecting coil of a cathode ray tube and for generating a second synchronizing signal synchronous with said deflecting voltage.

8. An image display apparatus as claimed in claim 7, wherein said input synchronizing signal to be divided by said synchronizing signal dividing means is said second synchronizing signal.

9. An image display apparatus as claimed in claim 7, wherein said input synchronizing signal to be divided by said synchronizing signal dividing means is said first synchronizing signal.

10. An image display apparatus as claimed in claim 1 further comprising:

control means for generating control signals in response to a change of the frequency of the input synchronizing signal;

clock signal generating means for generating a high-frequency clock signal and a low-frequency clock signal having a half frequency of the frequency of said high-frequency clock signal; and clock signal switching means for selecting, in response to one of said control signals, said high-frequency clock signal or said low-frequency clock signal as a reading clock signal to be applied to said character generating means;

said synchronizing signal dividing means dividing said input synchronizing signal to generate a divided synchronizing signal having a half frequency of the frequency of said input synchronizing signal, said divided synchronizing signal being always applied to said character generating means.

11. An image display apparatus as claimed in claim 10, wherein, when the frequency of said input synchronizing signal is higher than or equal to a predetermined point, said clock signal switching means selects said high-frequency clock signal as the clock signal to be applied to said character generating means; and when the frequency of said input synchronizing signal is lower than said predetermined point, said clock signal switching means selects said low-frequency clock signal as the clock signal to be applied to said character generating means; said input synchronizing signal, said divided synchronizing signal, a basic clock signal, and a reading clock signal having a half frequency of the frequency of said basic clock signal being always applied to a read address reset terminal, a write address reset terminal, a read clock terminal, and a write clock terminal of said character speed converting means, respectively.

12. An image display apparatus as claimed in claim 11, wherein said high-frequency clock signal is said basic clock signal, and said low-frequency clock signal is said reading clock signal.

13. An image display apparatus as claimed in claim 1, wherein said character speed converting means is a one line memory of a first-in first out type.

14. An image display apparatus as claimed in claim 1, further comprising image signal processing means for processing an image signal included in an input signal, said input signal including said input synchronizing signal.

* * * * *